UNITED STATES PATENT OFFICE.

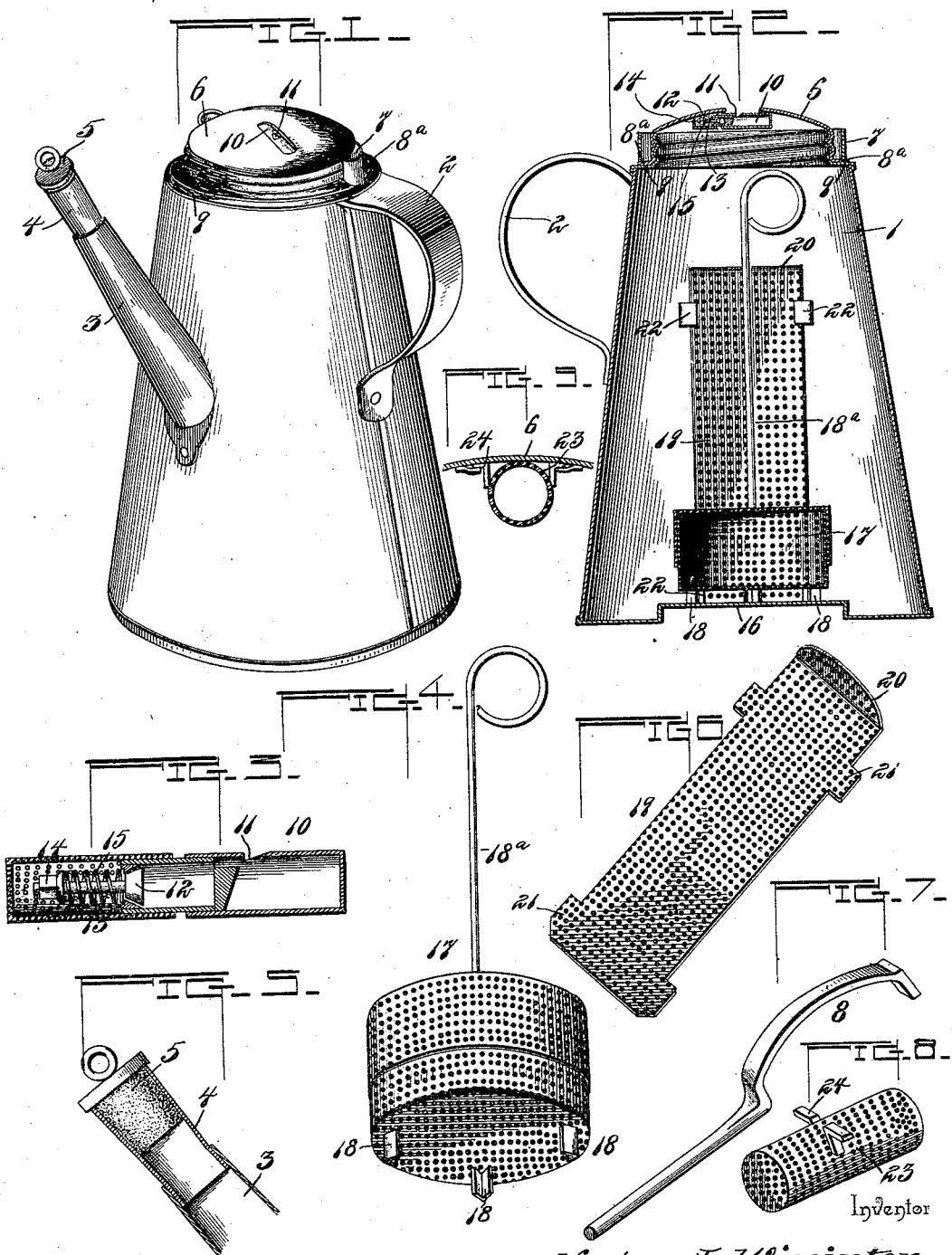

NEWTON JASPER WIGGINTON, OF WINCHESTER, VIRGINIA.

COFFEE OR TEA POT.

SPECIFICATION forming part of Letters Patent No. 579,666, dated March 30, 1897.

Application filed September 21, 1896. Serial No. 606,557. (No model.)

*To all whom it may concern:*

Be it known that I, NEWTON JASPER WIGGINTON, a citizen of the United States, residing at Winchester, in the county of Frederick and State of Virginia, have invented a new and useful Coffee-Pot, of which the following is a specification.

The invention relates to improvements in coffee-pots.

The object of the invention is to improve the construction of coffee-pots, to retain all the strength of the coffee and preserve to the highest degree all the natural flavor or aroma, and to confine the grounds within the same and prevent the coffee from being burned.

A further object of the invention is to provide a signal adapted to give an alarm when the contents of the coffee-pot boils.

The invention consists in the construction and novel combination and arrangement of parts hereinafter fully described, illustrated in the accompanying drawings, and pointed out in the claims hereto appended.

In the drawings, Figure 1 is a perspective view of a coffee-pot constructed in accordance with this invention. Fig. 2 is a vertical sectional view of the same. Fig. 3 is an enlarged detail sectional view illustrating the construction of the whistle and its valve. Fig. 4 is a detail perspective view of the foraminous coffee-receptacle. Fig. 5 is a detail sectional view showing the stopper fitting in the spout. Fig. 6 is a detail view of the removable filter. Fig. 7 is a detail view of the spanner or wrench for unscrewing the lid of the coffee-pot. Fig. 8 is a detail perspective view of the filter of the valve. Fig. 9 is a detail sectional view illustrating the manner of mounting the valve-filter on the cover.

Like numerals of reference designate corresponding parts in all the figures of the drawings.

1 designates a coffee-pot provided with a usual handle 2, and having a spout 3 with a slightly-flaring extension 4 receiving a removable stopper 5, which is adapted to render the spout air-tight. The coffee-pot is provided with a screw-cover 6, having an arched top portion and provided at diametrically opposite points with exteriorly-arranged projections 7, consisting, preferably, of loops, as shown, and adapted to be engaged by a spanner or wrench 8. The engaging portion of the spanner or wrench is curved to conform to the arched or concavo-convex top portion of the screw-cover, which is adapted to be removed when heated without the hand of the operator coming in contact with it.

The screw-cover is air-tight, being provided with a flange 8 to fit against an annular upper shoulder 9 of the body of the coffee-pot, and it is provided with a whistle 10. By means of the cork or stopper of the spout and the screw-cover the coffee-pot is perfectly air-tight, and it is thereby adapted to retain the strength of the coffee and preserve to the highest degree all the natural flavor or aroma of the coffee.

The whistle 10, which is mounted upon the cover, has an opening 11 communicating with the outside air, and it is provided within the cover with an outwardly-acting spring-controlled valve 12, adapted to prevent the escape of the steam until the same has sufficient force to sound the whistle. The valve 12, which is arranged within the barrel or body of the whistle, is tapered and fits on a tapering seat, and it is provided with a stem 13, extending outward through the opening of the whistle. The stem is threaded and receives a nut 14, which is engaged by a spring 15, disposed on the stem and interposed between the nut and the whistle. The nut controls the tension of the spring and enables the valve to be readily regulated, so that it will operate properly. As soon as the force of the steam within the coffee-pot exceeds the power of the spring the valve will open and the whistle will be blown.

The central portion 16 of the bottom of the coffee-pot is raised or inwardly offset, as shown, to prevent it from sagging upon the stove and to concentrate the heat, and the coffee is placed within a cylindrical foraminous receptacle 17, provided with feet 18, which rest upon the raised portion of the bottom of the coffee-pot. The receptacle is composed of two telescoping sections, the lower section serving as a body and the upper portion forming a cover, and it is adapted to prevent the coffee from being burned. The cover is provided with a stem 18, having a handle located adjacent to the top of the coffee-pot to enable the receptacle to be readily removed.

A removable filter 19 is arranged substantially vertically in the coffee-pot and covers the spout-opening. Its lower ends rest upon the bottom of the coffee-pot, and its upper end is provided with a segmental flange 20, the curved edge of which fits against the inner face of the coffee-pot. The filter consists of a perforated or foraminous plate, and is provided at opposite sides with upper lugs or extensions 21, which interlock with substantially L-shaped flanges 22. The lugs of the filter can be readily disengaged from the L-shaped flanges of the coffee-pot when it is desired to remove the filter for cleaning it and the pot.

The whistle is provided with a filter 23, which covers the valve mechanism and prevents the same from becoming clogged with coffee-grounds. The filter 23 is cylindrical, and is detachably secured to the inner face of the screw-cover by means of laterally-extending lugs 24, which engage and interlock with suitable flanges of the said cover. By this construction the filter is rendered removable in order that access may be readily had to the spring of the valve to regulate the tension thereof.

It will be seen that the coffee-pot is adapted to sound an alarm when its contents boils, that the bottom is prevented from sagging upon a stove, and that an effective filter is provided, and the coffee is prevented from being burned.

What I claim is—

1. The combination of a coffee-pot provided in its cover with an opening, a substantially horizontally-disposed whistle mounted on the inner face of the cover and having an opening located at the opening of the cover, an outwardly-acting spring-controlled valve mounted on the whistle and arranged within the coffee-pot, and a tubular filter detachably mounted at the valve of the whistle to prevent the same or its spring from becoming clogged with coffee-grounds, substantially as described.

2. The combination of a coffee-pot provided on the inner face of its cover with opposite flanges, a substantially horizontally-disposed whistle mounted on the inner face of the cover of the pot, provided with an exteriorly-arranged opening and having a valve-seat, an outwardly-acting valve arranged on the valve-seat and provided with a threaded stem, a spring arranged on the threaded stem and controlling the valve, a nut engaging the threaded stem to regulate the tension of the spring, and a tubular filter covering the spring of the valve and provided with laterally-extending lugs interlocked with the flanges of the cover, substantially as described.

3. The combination of a coffee-pot provided in its cover with an opening, and a substantially horizontally-disposed whistle located entirely within the coffee-pot, mounted on the inner face of the cover and having an opening located at the opening of the cover, said whistle being provided with an outwardly-acting spring-controlled valve, substantially as and for the purpose described.

In testimony that I claim the foregoing as my own I have hereto affixed my signature in the presence of two witnesses.

NEWTON JASPER WIGGINTON.

Witnesses:
 N. A. COOPER,
 PHIL. H. GOLD.